(12) United States Patent
Inaba et al.

(10) Patent No.: US 6,881,460 B2
(45) Date of Patent: Apr. 19, 2005

(54) LAMINATED RESIN

(75) Inventors: Takeshi Inaba, Settsu (JP); Taketo Kato, Settsu (JP); Shigehito Sagisaka, Settsu (JP); Takuya Arase, Settsu (JP); Tetsuo Shimizu, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 10/203,344

(22) PCT Filed: Feb. 13, 2001

(86) PCT No.: PCT/JP01/00985

§ 371 (c)(1),
(2), (4) Date: Nov. 1, 2002

(87) PCT Pub. No.: WO01/58686

PCT Pub. Date: Aug. 16, 2001

(65) Prior Publication Data

US 2003/0157335 A1 Aug. 21, 2003

(30) Foreign Application Priority Data

Feb. 10, 2000 (JP) .......................................... 2000-34167

(51) Int. Cl.[7] ........................... B32B 1/08; B32B 27/08; B32B 27/34; B32B 31/30
(52) U.S. Cl. ..................... 428/36.91; 428/332; 428/339; 428/421; 428/422; 428/474.4; 156/244.11; 156/244.24; 264/211.12
(58) Field of Search ............................... 428/36.91, 332, 428/339, 421, 422, 474.4; 156/244.11, 244.24; 264/211.12

(56) References Cited

U.S. PATENT DOCUMENTS

| 5,554,425 A | * | 9/1996 | Krause et al. ........... 428/36.91 |
| 5,804,670 A | | 9/1998 | Stoeppelmann |
| 5,858,492 A | | 1/1999 | Roeber et al. |
| 6,162,385 A | | 12/2000 | Grosse-Puppendahl et al. |

FOREIGN PATENT DOCUMENTS

| EP | 1 086 962 | 3/2001 |
| JP | 5-8353 | 1/1993 |
| JP | 7-53823 | 2/1995 |
| JP | 8-252891 A | 10/1996 |
| JP | 9-194815 A | 7/1997 |
| JP | 10-311461 A | 11/1998 |
| JP | 10-323953 A | 12/1998 |
| WO | WO 99/45044 A | 9/1999 |

OTHER PUBLICATIONS

English Translation of International Preliminary Examination Report for PCT/JP01/00985 Dated Mar. 1, 2002.

* cited by examiner

*Primary Examiner*—Ramsey Zacharia
(74) *Attorney, Agent, or Firm*—Sughrue Mion, PLLC

(57) ABSTRACT

A multilayer molding having a polyamide-based resin as an outer layer, the multilayer molding including a fluorine-containing resin as an inner layer, as well as a resin laminate which can form the multilayer molding. The resin laminate has a layer (A) including a polyamide-based resin and a layer (B) including a fluorine-containing ethylenic polymer laminated to the layer (A), the polyamide-based resin having an amine value of 10 to 60 equivalents/$10^6$ g, and the fluorine-containing ethylenic polymer being a fluorine-containing ethylenic polymer having a carbonyl group.

32 Claims, No Drawings

LAMINATED RESIN

TECHNICAL FIELD

The present invention relates to a resin laminate formed by laminating a polyamide-based resin and a fluorine-containing ethylenic polymer.

BACKGROUND ART

Resin laminates formed by laminating a polyamide-based resin layer and a fluorine-containing ethylenic polymer layer are expected as composite materials having fluororesin characteristics, such as heat resistance, oil and chemical resistance and low liquid agent permeability, as well as polyamide-based resin characteristics, such as high strength, high toughness, light weight, good processability and, in particular, flexibility.

However, the polyamide-based resin layer and the layer comprising the fluororesin such as a fluorine-containing ethylenic polymer are generally low in interlayer adhesiveness. Therefore, attempts have so far been made to increase the interlayer adhesion strength. Thus, for example, Japanese Kokai Publication Hei-05-8353 discloses a multilayer tube comprising an outer layer comprising a polyamide resin and an inner layer comprising a fluororesin. In the gazette cited above, it is proposed that, for securing a certain level of adhesion strength between the polyamide resin layer and the fluororesin layer, crosslinked structures are introduced among molecules in both layers by irradiation.

A technology has also been developed according to which the resin layer to be adhered to a polyamide-based resin is made of a blend with a fluororesin. Thus, for example, Japanese Kokai Publication Hei-07-53823 discloses a multilayer tube comprising an outer layer comprising a polyamide resin and an inner layer comprising a fluororesin, wherein a resin composition comprising both a specific polyamide resin and a fluorine-containing resin is laminated to the polyamide resin layer so that it may serve as an adhesive layer. When this method is used, however, the morphology of the adhesive layer changes according to the molding conditions due to the intrinsically poor compatibility between the constituent resins of the adhesive layer, namely the polyamide resin and fluorine-containing resin, and the morphology change influences on the cohesive force of the adhesive layer itself and on the adhesion strength thereof with the other layers. Accordingly, such problems arise as a tendency toward variation in adhesion strength according to environmental factors, such as molding conditions and temperature conditions during use, and difficulty in securing a constant quality level. In addition, this is not a technology to increase the adhesiveness of the fluororesin itself but one merely utilizing the adhesiveness of the polymer blend. The use of such polymer blend in lieu of the fluororesin results in an impairment in those excellent characteristics of the fluororesin.

To solve this problem, attempts have been made to improve fluororesin species themselves, and various fluororesin materials have been proposed. For example, the WO 99/45044 pamphlet discloses a laminate which comprises a fluorine-containing polymer having carbonate groups and/or carbonyl halide groups as a fluororesin to be laminated with a polyamide resin.

However, any of these technologies does not disclose an improvement in polyamide-based resins themselves. Therefore, from a novel technological viewpoint, a technology is demanded of further improving the interlayer adhesion strength between a polyamide-based resin and a fluororesin.

Thus, there are demands for molded articles, such as tubes, hoses, bottles and tanks, which are imparted with good mechanical properties and high resistance to environmental factors such as heat and various chemical substances by providing a polyamide-based resin as an outer layer and, further, demands for molded articles which can realize high levels of oil and chemical resistance and low liquid agent permeability in such moldings as tubes, hoses, bottles and tanks by providing a fluorine-containing resin as an innermost layer, in particular demands for such good multilayer molded articles which can be molded by co-extrusion molding and be markedly and stably improved in interlayer adhesion strength.

SUMMARY OF THE INVENTION

In view of the above-mentioned state of the art, it is an object of the present invention to provide a multilayer molded article comprising a polyamide-based resin and a fluorine-containing ethylenic polymer each as a constituent layer and being excellent in interlayer adhesion strength, in particular a multilayer molded article which comprises a polyamide resin as an outer layer and a fluorine-containing resin as an inner layer, as well as a resin laminate from which such multilayer molded article can be produced.

As a result of intensive investigations to accomplish the above object, the present inventors found that when a polyamide-based resin having an amine value in a specific range is used as one constituent layer and laminated to a specific fluorine-containing ethylenic polymer, a marked and stable improvement can be attained in the adhesion strength between the polyamide-based resin and fluorine-containing ethylenic polymer layers and, based on such finding, they have completed the present invention. Thus, the present invention relates to a resin laminate which comprises a layer (A) comprising a polyamide-based resin and a layer (B) comprising a fluorine-containing ethylenic polymer laminated to said layer (A), said polyamide-based resin having an amine value of 10 to 60 equivalents/$10^6$ g, and said fluorine-containing ethylenic polymer being a fluorine-containing ethylenic polymer having a carbonyl group.

In accordance with a preferred embodiment of the invention, said polyamide-based resin has an acid value of not higher than 80 equivalents/$10^6$ g and appropriately comprises at least one species selected from the group consisting of nylon 6, nylon 66, nylon 11, nylon 12, nylon 610, nylon 612, nylon 6/66, nylon 66/12, nylon 6/polyester copolymers, nylon 6/polyether copolymers, nylon 12/polyester copolymers, nylon 12/polyether copolymers, and blends thereof.

In another preferred embodiment of the invention, said layer (B) is one formed by melt extrusion of a fluorine-containing ethylenic polymer preferably having 3 to 1,000 carbonyl groups, in particular carbonyl groups derived from peroxide, especially carbonate groups and/or carbonyl halide groups, in total, per $1 \times 10^6$ main chain carbon atoms.

For the resin laminate according to the invention, an initial interlayer adhesion strength between the layer (A) comprising the polyamide-based resin and the layer (B) comprising the fluorine-containing ethylenic polymer can be not less than 20 N/cm.

In one embodiment of the invention, the layer (B) comprising the fluorine-containing ethylenic polymer contains an electrically conductive material, in another embodiment, the layer (B) comprising the fluorine-containing ethylenic polymer is further laminated to a layer (C) which comprises a fluororesin and may contain an electrically conductive material and, in the other embodiment, said layer (C) comprising the fluororesin and not containing the electrically conductive material is further laminated to a layer (D) comprising a fluororesin and an electrically conductive material.

The present invention also relates to a multilayer molded article which is made of the above resin laminate, especially to a molded article selected from the group consisting of films, hoses, tubes, bottles and tanks, in particular to an automotive fuel piping tube or hose.

The present invention further relates to a production method of a multilayer molded article having an at least two-layer structure comprising a layer (A) formed by melt extrusion of a polyamide-based resin having an amine value of 10 to 60 equivalents/$10^6$ g and a layer (B) formed by melt extrusion of a fluorine-containing ethylenic polymer having 3 to 1,000 carbonyl groups, in total, per $1 \times 10^6$ main chain carbon atoms and laminated to said layer (A), which method comprises molding a resin laminate having said layer (A) and said layer (B) by melt extrusion to form a multilayer molding and subjecting the thus-formed multilayer molding to 0.01 to 10 hours of heat treatment at a temperature lower than the lowest melting point among the melting points of the resins constituting said molding to obtain the multilayer molded article.

DETAILED DISCLOSURE OF THE INVENTION

In the following, the present invention is described in detail.

The resin laminate of the invention comprises a layer (A) comprising a polyamide-based resin and a layer (B) comprising a fluorine-containing ethylenic polymer laminated to said layer (A). In the following, the polyamide-based resin and the fluorine-containing ethylenic polymer which constitute these layers are first described one by one in detail.

Polyamide-Based Resin

The polyamide-based resin so referred to herein means a crystalline macromolecule having the amide bond —NH—CO— in a repeating unit within the molecular. As such, there may be mentioned, for example, the so-called nylon resins, namely resins in which a majority of amide bonds are bound to an aliphatic or alicyclic structure. Specifically, there may be mentioned, for example, nylon 6, nylon 66, nylon 11, nylon 12, nylon 610, nylon 612, nylon 6/66, nylon 66/12, nylon 46 and metaxylylenediamine/adipic acid polymers, and blends of these.

The polyamide-based resin to be used in the practice of the invention may have a structure having no amide bond in a repeating unit as partially occurring within the polyamide-based resin in a block or graft form. As such resin, there may be mentioned the so-called polyamide resin elastomers such as nylon 6/polyester copolymers, nylon 6/polyether copolymers, nylon 12/polyester copolymers and nylon 12/polyether copolymers. These polyamide resin elastomers are block copolymers resulting from copolymerization of nylon resin oligomers and polyester resin oligomers or polyether resin oligomers by forming ester bonding or ether bonding. The above polyester resin oligomers include, for example, polycaprolactone and polyethylene adipate, and the polyether resin oligomers include, for example, polyethylene glycol, polypropylene glycol and polytetramethylene glycol. Particularly preferred embodiments are nylon 6/polytetramethylene glycol copolymers and nylon 12/polytetramethylene glycol copolymers.

Meanwhile, polyamide-based resins are generally susceptible to degradation reaction upon heating in the step of molding, generating monomers and other low-molecular products or causing gelation. For preventing such degradation and for preventing discoloration due to oxidation, it is a widely employed practice to add a monocarboxylic acid or a derivative thereof in the step of polymerization to thereby effect the so-called terminal blocking and thus reduce the amine value. Therefore, polyamide-based resins widely used generally have an amine value of less than 10 equivaelnts/$10^6$ g. However, polyamide-based resins, when laminated to fluorine-containing ethylenic polymers, may hitherto fail to show a satisfactory level of adhesion strength in some instances. Investigations into this phenomenon unexpectedly revealed that when the polyamide-based resin used has an amine value of less than 10 equivalents/$10^6$ g, the adhesion strength between the layer formed by using such resin and a fluorine-containing ethylenic polymer layer laminated adjacent to the polyamide-based resin layer is not satisfactory but that the adhesion strength is markedly improved by increasing the above-mentioned amine value. On the other hand, it was also found that when this value exceeds 60 equivalents/$10^6$ g, the moldings are inferior in mechanical properties, tend to discolor during storage and poor in handleability. Therefore, in accordance with the present invention, the amine value of the polyamide-based resin is required to be 10 to 60 equivalents/$10^6$ g, preferably 10 to 50 equivalents/$10^6$ g, more preferably 10 to 35 equivalents/$10^6$ g, still more preferably 15 to 30 equivalents/$10^6$ g.

In the practice of the present invention, the polyamide-based resin preferably has an acid value of not higher than 80 equivalents/$10^6$ g. Even when the acid value exceeds 80 equivalents/$10^6$ g, a sufficient level of adhesion strength may be manifested if the amine value is within the above range. In some cases, however, the molecular weight of the above resin may not be always sufficient and, when a high adhesion strength is required, a problem may arise, namely the required adhesion strength cannot be obtained in spite of optimization of the layer (B) comprising the fluorine-containing ethylenic polymer. Such problem can be avoided when the acid value is not higher than 80 equivalents/$10^6$ g, preferably not higher than 70 equivalents/$10^6$ g, more preferably not higher than 60 equivalents/$10^6$ g and, in particular, when high adhesion strength is required, not higher than 40 equivalents/$10^6$ g.

In the practice of the present invention, the polyamide-based resin is preferably selected from among appropriate species having a melting point of not lower than 130° C. When the melting point is lower than 130° C., the layer formed therefrom may be poor in mechanical properties, heat resistance or the like. Preferably, it is 150 to 300° C., more preferably 150 to 270° C.

For use in extrusion molding or blow molding in the practice of the invention, the polyamide-based resin preferably has a relative viscosity, which indicates a molecular weight, of not less than 1.8, more preferably not less than 2.0. When it is less than 1.8, the resin may show poor moldability in the step of molding and resulting molded articles may be inferior in mechanical properties. On the other hand, the upper limit is preferably not more than 4.0. If it exceeds 4.0, the polymerization of the resin itself is difficult and, even if the resin is obtained, the resin may be poor in moldability in the step of the above-mentioned molding. The above-mentioned relative viscosity is determined as described in JIS K 6810.

Suited for use as the polyamide-based resin in the practice of the invention where toughness is required as in the case of using it in producing molded tubes, hoses or like moldings are those resins which contain, as a main component (not less than 50% by weight), nylon 11, nylon 12, nylon 610, nylon 612, a nylon 6/polyether copolymer or a nylon 12/polyether copolymer. Among these, nylon 11, nylon 12 and nylon 612 are more preferred.

In the practice of the present invention, the polyamide-based resin may contain a plasticizer, another resin or the like, at levels that do not deteriorate the purpose of the invention. The above plasticizer renders the resin composition flexible and can improve the low temperature mechanical properties of the resin laminates (e.g. tubes or hoses), in particular. Incorporation of another resin can improve, for example, the impact resistance of the resin laminates (e.g. tubes or hoses).

The above-mentioned plasticizer is not particularly restricted but includes, for example, hexylene glycol, glycerol, β-naphthol, dibenzylphenol, octylcresol, bisphenol A and like bisphenol compounds, octyl p-hydroxybenzoate, 2-ethylhexyl p-hydroxybenzoate, heptyl p-hydroxybenzoate, p-hydroxybenzoic acid-ethylene oxide and/or propylene oxide adducts, ε-caprolactone, phosphate esters of phenolic compounds, N-methylbenzenesulfonamide, N-ethylbenzenesulfonamide, N-butylbenzenesulfonamide, toluenesulfonamide, N-ethyltoluenesulfonamide, and N-cyclohexyltoluenesulfonamide, etc.

Another resin to be incorporated in the polyamide-based resin is preferably one having good compatibility. Examples are ester- and/or carboxylic acid-modified olefin resins, acrylic resins (in particular glutarimide group-containing acrylic resins), ionomer resins, polyester resins, phenoxy resins, ethylene-propylene-diene copolymers, and polyphenylene oxide.

In the practice of the invention, the polyamide-based resin may contain a colorant, various additives or the like at levels that do not deteriorate the purpose of the invention. As the above additives, there may be mentioned antistatic agents, flame retardants, heat stabilizers, ultraviolet absorbers, lubricants, mold release agents, nucleating agents, reinforcing agents (fillers) and the like.

In the practice of the invention, the layer (A) comprising the above polyamide-based resin comprises the polyamide-based resin mentioned above and, optionally, one or more of the above-mentioned various components incorporated according to need.

Fluorine-Containing Ethylenic Polymer

The fluorine-containing ethylenic polymer to be used in accordance with the present invention is a fluorine-containing ethylenic polymer having a carbonyl group (hereinafter also referred to as "fluorine-containing ethylenic polymer according to the invention"). The term "carbonyl group" as used herein means a functional group having —C(=O)— essentially reactive with such functional groups as amide group or amino group in the polyamide-based resin constituting the above-mentioned layer (A). More specifically, it includes carbonate, carbonyl halide, aldehyde, ketone, carboxyl, ester, acid anhydride, isocyanate and the like. On the contrary, amide, imide, urethane, urea and the like, in spite of their having —C(=O)—, are poor in reactivity as compared with the carbonate groups and other functional groups mentioned above and cannot provide a sufficient level of adhesion strength with the layer (A) comprising the polyamide-based resin, hence may be said to be essentially incapable of reacting with the functional groups in the polyamide-based resin constituting the above layer (A). Thus, the term "carbonyl group" as used herein does not include at least the amide, imide, urethane or urea group. Preferred as the above carbonyl group in the practice of the invention are the carbonate group, carbonyl halide group, carboxyl group, ester group and acid anhydride group, which can be introduced with ease and are highly reactive with the polyamide-based resin. Carbonate group and carbonyl halide group are more preferred.

The number of carbonyl groups in the fluorine-containing ethylenic polymer according to the invention may appropriately be selected according to the species of the other material to be laminated, the shape, the object of adhesion, the use, the adhesion strength required, the shape of said polymer, the method of adhesion, and the like. It is preferred, however, that the number of carbonyl groups be 3 to 1,000, in total, per $1 \times 10^6$ main chain carbon atoms. When the number of carbonyl groups per $1 \times 10^6$ main chain carbon atoms is less than 3, a sufficient adhesion strength may not be attained. When it exceeds 1,000, the adhesion strength may be reduced as a result of chemical modification of the carbonyl groups in the step of adhesion. More preferably, the number is 3 to 500, still more preferably 3 to 300, particularly preferably 5 to 150. The carbonyl group content in the fluorine-containing ethylenic polymer can be determined by infrared absorption spectrophotometry.

Therefore, in cases where the fluorine-containing ethylenic polymer according to the invention has carbonate groups and/or carbonyl halide groups, the number of carbonate groups, when the polymer has carbonate groups, is preferably 3 to 1,000 per $1 \times 10^6$ main chain carbon atoms, the number of carbonyl halide groups, when the polymer has carbonyl halide groups, is preferably 3 to 1,000 per $1 \times 10^6$ main chain carbon atoms, or the total number of carbonate groups and carbonyl halide groups, when the polymer has both group species, is preferably 3 to 1,000 per $1 \times 10^6$ main chain carbon atoms. When the number of carbonate group and/or carbonyl halide group is less than 3 per $1 \times 10^6$ main chain carbon atoms, no sufficient adhesion strength may be attained. When it exceeds 1,000, the adhesion strength may be reduced by the adverse influences of gases generated along the adhesion interface as a result of chemical modification of carbonate groups and/or carbonyl halide groups in the step of adhesion. From the viewpoint of heat stability and chemical resistance, the total number of carbonate groups and carbonyl halide groups is more preferably 3 to 500, still more preferably 3 to 300, particularly preferably 5 to 150. Where 10 or more, more preferably 20 or more, carbonyl halide groups, which are particularly excellent in reactivity with polyamide-based resins, are present in the fluorine-containing ethylenic polymer per $1 \times 10^6$ main chain carbon atoms, good adhesion to the polyamide-based resin layer (A) can be attained even when the total carbonyl group content is less than 150 per $1 \times 10^6$ main chain carbon atoms.

The carbonate groups in the fluorine-containing ethylenic polymer to be used in accordance with the present invention are groups generally having the bonding —OC(=O)O— and specifically have a structure of —OC(=O)O—R (wherein R is an organic group (e.g. $C_1$–$C_{20}$ alkyl group (in particular $C_1$–$C_{10}$ alkyl group), an ether bond-containing $C_2$–$C_{20}$ alkyl group or the like) or a group VII element). As preferred examples of the carbonate group, there may be mentioned —OC(=O)OCH$_3$, —OC(=O)OC$_3$H$_7$, —OC(=O)OC$_8$H$_{17}$, —OC(=O)OCH$_2$CH$_2$CH$_2$OCH$_2$CH$_3$ and the like.

The carbonyl halide groups in the fluorine-containing ethylenic polymer according to the invention specifically have a structure of —COY (wherein Y is a halogen element), and examples are —COF and —COCl.

The fluorine-containing ethylenic polymer having such carbonyl groups itself can retain those excellent characteristics which fluorine-containing resins have, such as chemical resistance, solvent resistance, weathering resistance, and antifouling and non-stick properties, and can provide the molded laminate with such excellent characteristics of the fluorine-containing resin without deteriorating thereof.

The fluorine-containing ethylenic polymer according to the invention contains carbonyl groups within the polymer chain thereof. The mode in which the above carbonyl groups are contained in the polymer chain is not particularly restricted but, for example, carbonyl groups may be bound to the polymer chain termini or polymer side chains. Among them, polymers having carbonyl groups at polymer chain termini are preferred since they will not markedly reduce the heat resistance, mechanical properties and chemical resistance or since they are advantageous from the viewpoint of productivity and cost. A method of introducing carbonyl groups into polymer chain termini using a polymerization initiator having a carbonyl-containing group(s) or a functional group(s) convertible to a carbonyl group(s), for example a peroxy carbonate or peroxy ester is a preferred embodiment since introduction can be realized very easily and the content of carbonyl groups introduced can be controlled with ease. The carbonyl group(s) derived from a peroxide so referred to herein means a carbonyl group(s) directly or indirectly derived from a functional group(s) contained in a peroxide.

Even when a fluorine-containing ethylenic polymer containing no carbonyl groups is contained partially in the fluorine-containing ethylenic polymer according to the invention, the only requirement is that the total number of carbonyl groups per $1 \times 10^6$ main chain carbon atoms on the whole polymer basis should be within the range described above.

In the practice of the invention, the species and structure of the above fluorine-containing ethylenic polymer can appropriately be selected according to the purpose of the use, application and method of use. Among others, those having a melting point of 160 to 270° C. are preferred, however, and such polymers, particularly when used for lamination by heating/melting and adhesion operation with other material, can fully show the adhesion properties of carbonyl groups and can advantageously provide firm adhesion strength, in particular, when laminated directly with the other material. For enabling lamination also with an organic material having relatively low heat resistance, the melting point is more preferably not higher than 250° C., still more preferably not higher than 230° C., particularly preferably not higher than 210° C.

The fluorine-containing ethylenic polymer according to the invention preferably has a molecular weight within such a range that the polymer can be molded at temperatures below the heat decomposition point and that the moldings obtained can display those excellent mechanical properties, chemical resistance and other properties which are intrinsic in the fluorine-containing ethylenic polymer. More specifically, when the melt flow rate (MFR) is taken as an index of molecular weight, the MFR at an arbitrary temperature within the range of about 230 to 350° C., which is a temperature range generally used in molding fluororesins, is preferably 0.5 to 100 g/10 minutes.

The fluorine-containing ethylenic polymer according to the invention comprises a fluorine-containing ethylenic polymer chain and a carbonyl group(s) bound thereto. Structurally, the above polymer chain is generally a homopolymer or copolymer chain having a repeating unit derived from at least one fluorine-containing ethylenic monomer species, and it may be a polymer chain resulting from polymerization of a fluorine-containing ethylenic monomer(s) or polymerization of a fluorine-containing ethylenic monomer(s) and a fluorine atom-free ethylenic monomer(s).

The above-described fluorine-containing ethylenic monomer is a fluorine atom-containing, olefinically unsaturated monomer and specifically includes tetrafluoroethylene, vinylidene fluoride, chlorotrifluoroethylene, vinyl fluoride, hexafluoropropylene, hexafluoroisobutene, monomers represented by the formula (ii):

$$CH_2=CX^1(CF_2)_nX^2 \qquad (ii)$$

in the formula, $X^1$ is H or F, $X^2$ is H, F or Cl and n is an integer of 1 to 10, perfluoro(alkyl vinyl ether) species and the like.

The above-described fluorine atom-free ethylenic monomer is preferably selected from among ethylenic monomers containing not more than 5 carbon atoms so that the heat resistance, chemical resistance and like characteristics may not be deteriorated. Specifically, there may be mentioned ethylene, propylene, 1-butene, 2-butene, vinyl chloride, vinylidene chloride, etc.

In cases where a fluorine-containing ethylenic monomer(s) and a fluorine atom-free ethylenic monomer(s) are used, the monomer composition may be a ratio of 10 to 100 mole percent (e.g. 30 to 100 mole percent) of the fluorine-containing ethylenic monomer(s) to 0 to 90 mole percent (e.g. 0 to 70 mole percent) of the fluorine atom-free ethylenic monomer(s).

By selecting the fluorine-containing ethylenic monomer species and fluorine atom-free ethylenic monomer species, and the combination and composition ratio thereof, etc., the melting point or glass transition point of the fluorine-containing ethylenic polymer according to the invention can be adjusted and the polymer may be either resin-like or elastomer-like. The form and properties of the fluorine-containing ethylenic polymer can appropriately be selected according to the object and application field of adhesion and to the object and application field of the laminate.

Preferred as the fluorine-containing ethylenic polymer according to the invention is a carbonyl group-containing, fluorine-containing ethylenic polymer comprising the tetrafluoroethylene unit from the viewpoint of heat resistance and chemical resistance, or a carbonyl group-containing, fluorine-containing ethylenic copolymer comprising the vinylidene fluoride unit is preferred from the viewpoint of moldability/workability.

As preferred typical examples of the fluorine-containing ethylenic polymer according to the invention, there may be mentioned carbonyl group-containing, fluorine-containing ethylenic copolymers (I) to (V) essentially resulting from polymerization of the monomers mentioned below:

(I) copolymers resulting from polymerization of at least tetrafluoroethylene and ethylene;

(II) copolymers resulting from polymerization of at least tetrafluoroethylene and a compound represented by the general formula:

$$CF_2=CF-Rf^1$$

in the formula, $Rf^1$ represents $CF_3$ or $ORf^2$ and $Rf^2$ represents a perfluoroalkyl group containing 1 to 5 carbon atoms);

(III) copolymers resulting from polymerization of at least vinylidene fluoride;
(IV) copolymers resulting from polymerization of at least the following a, b and c:
a. 20 to 90 mole percent of tetrafluoroethylene;
b. 10 to 80 mole percent of ethylene;
c. 1 to 70 mole percent of a compound represented by the general formula:

$$CF_2=CF-Rf^1$$

in the formula, $Rf^1$ represents $CF_3$ or $ORf^2$ and $Rf^2$ represents a perfluoroalkyl group containing 1 to 5 carbon atoms); and
(V) copolymers resulting from polymerization of at least the following d, e and f:
d. 15 to 60 mole percent of vinylidene fluoride;
e. 35 to 80 mole percent of tetrafluoroethylene;
f. 5 to 30 mole percent of hexafluoropropylene.

The carbonyl group-containing, fluorine-containing ethylenic polymers specifically mentioned above are all preferred in view of their good heat resistance, chemical resistance, weathering resistance, and electrical insulating and non-stick properties.

As the copolymers (I) mentioned above, there may more specifically be mentioned, for example, carbonyl group-containing copolymers having a polymer chain comprising 20 to 90 mole percent (e.g. 20 to 60 mole percent) of the tetrafluoroethylene unit, 10 to 80 mole percent (e.g. 20 to 60 mole percent) of the ethylene unit and 0 to 70 mole percent of the monomer unit copolymerizable with these, relative to the whole monomer except for the carbonyl group-containing monomer, when the polymer has a carbonyl group-containing functional group(s) on its side chain(s).

The above monomer copolymerizable includes hexafluoropropylene, chlorotrifluoroethylene, monomers represented by the formula (ii):

$$CH_2=CX^1(CF_2)_nX^2 \quad (ii)$$

in the formula, $X^1$ is H or F, $X^2$ is H, F or Cl and n is an integer of 1 to 10, perfluoro(alkyl vinyl ether) species, propylene and the like. One or more of these are generally used.

Such fluorine-containing ethylenic polymers are preferred because of their good heat resistance, chemical resistance, weathering resistance, electrical insulating and non-stick properties, in particular.

Preferred as the above copolymer (I) among them are, for example:
(I-1) carbonyl group-containing copolymers having a polymer chain comprising 62 to 80 mole percent of the tetrafluoroethylene unit, 20 to 38 mole percent of the ethylene unit and 0 to 10 mole percent of the unit derived from another monomer; and
(I-2) carbonyl group-containing copolymers having a polymer chain comprising 20 to 80 mole percent of the tetrafluoroethylene unit, 10 to 80 mole percent of the ethylene unit, 0 to 30 mole percent of the hexafluoropropylene unit and 0 to 10 mole percent of the unit derived from another monomer. These copolymers retain the excellent performance characteristics of tetrafluoroethylene/ethylene copolymers, can have a relatively low melting point and can maximally display their adhesiveness to other materials, hence are preferred.

Preferred as the above-mentioned copolymer (II) are, for example,
(II-1) carbonyl group-containing copolymers having a polymer chain comprising 65 to 95 mole percent, preferably 75 to 95 mole percent, of the tetrafluoroethylene unit and 5 to 35 mole percent, preferably 5 to 25 mole percent, of the hexafluoropropylene unit;
(II-2) carbonyl group-containing copolymers having a polymer chain comprising 70 to 97 mole percent of the tetrafluoroethylene unit and 3 to 30 mole percent of the $CF_2=CF-ORf^2$ unit (wherein $Rf^2$ is a perfluoroalkyl group containing 1 to 5 carbon atoms); and
(II-3) carbonyl group-containing copolymers having a polymer chain comprising the tetrafluoroethylene unit, hexafluoropropylene unit and the $CF_2=CFORf^2$ unit (wherein $Rf^2$ is as defined above), in which the hexafluoropropylene unit and the $CF_2=CF-ORf^2$ unit account for 5 to 30 mole percent in total.

The above II-1 to II-3 are the perfluoro type copolymers and are most excellent in heat resistance, chemical resistance, water repellency, non-stick, electric insulating and other properties, among fluorine-containing polymers.

As the above-mentioned copolymers (III), there may be mentioned, for example, carbonyl group-containing copolymers having a polymer chain comprising 15 to 99 mole percent of the vinylidene fluoride unit, 0 to 80 mole percent of the tetrafluoroethylene unit and 0 to 30 mole percent of the unit derived from at least one of hexafluoropropylene and chlorotrifluoroethylene, relative to the whole monomer except for the carbonyl-containing monomer, when the polymer has a carbonyl group-containing functional group(s) on its side chain(s).

More specifically, there may be mentioned, for example,
(III-1) carbonyl group-containing copolymers having a polymer chain comprising 30 to 99 mole percent of the vinylidene fluoride unit and 1 to 70 mole percent of the tetrafluoroethylene unit;
(III-2) carbonyl group-containing copolymers having a polymer chain comprising 60 to 90 mole percent of the vinylidene fluoride unit, 0 to 30 mole percent of the tetrafluoroethylene unit and 1 to 20 mole percent of the chlorotrifluoroethylene unit;
(III-3) carbonyl group-containing copolymers having a polymer chain comprising 60 to 99 mole percent of the vinylidene fluoride unit, 0 to 30 mole percent of the tetrafluoroethylene unit and 5 to 30 mole percent of the hexafluoropropylene unit; and
(III-4) carbonyl group-containing copolymers having a polymer chain comprising 15 to 60 mole percent of the vinylidene fluoride unit, 35 to 80 mole percent of the tetrafluoroethylene unit and 5 to 30 mole percent of the hexafluoropropylene unit.

The method of producing the fluorine-containing ethylenic polymer according to the invention is not particularly restricted but may comprise copolymerizing a carbonyl group-containing ethylenic monomer with fluorine-containing and/or ethylenic monomer species selected and used in an appropriate mixing ratio according to the desired fluorine-containing polymer. As appropriate examples of the carbonyl group-containing ethylenic monomer, there may be mentioned fluorine-containing monomers such as perfluoroacrylic acid (fluoride), 1-fluoroacrylic acid (fluoride), acryloyl fluoride, 1-trifluoromethacrylic acid (fluoride) and perfluorobutenoic acid and fluorine-free monomers such as acrylic acid, methacrylic acid, acryloyl chloride and vinylene carbonate. On the other hand, while various methods can be employed for producing fluorine-containing ethylenic polymers having a carbonyl group or groups at a polymer molecule terminus or termini, the method comprising using a peroxide, in particular a peroxy carbonate or a peroxy ester, as a polymerization initiator can preferably be employed from the economical viewpoint and the quality viewpoint, for example heat resistance and chemical resistance. By this method, it is possible to introduce, into a polymer chain terminus or termini, carbonyl groups derived from a peroxide, for example carbonate groups derived from a peroxy carbonate, ester groups derived from a peroxy ester, or carbonyl halide groups or carboxyl groups derived therefrom by functional group conversion. Among such polymerization initiators, peroxy carbonates can lower the polymerization temperature and do not involve side reactions in the initiation reaction, hence are preferably used.

Preferably used as the above peroxy carbonates are compounds represented by the following formulas (1) to (4):

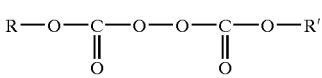

(1)

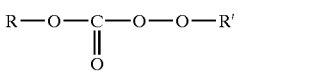

(2)

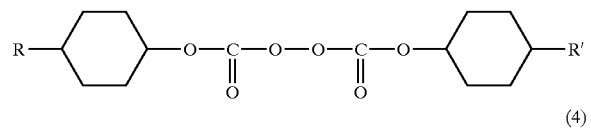

(3)

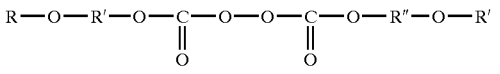

(4)

In the above formulas, R and R' each represents a straight or branched, saturated univalent hydrocarbon group containing 1 to 15 carbon atoms or an alkoxyl group-terminated, straight or branched, saturated univalent hydrocarbon group containing 1 to 15 carbon atoms and R" represents a straight or branched, saturated divalent hydrocarbon group containing 1 to 15 carbon atoms or an alkoxyl group-terminated straight or branched, saturated divalent hydrocarbon group containing 1 to 15 carbon atoms.

Particularly preferred among others are diisopropyl peroxydicarbonate, di-n-propyl peroxydicarbonate, tert-butylperoxy isopropyl carbonate, bis(4-tert-butylcyclohexyl) peroxydicarbonate, di-2-ethylhexyl peroxydicarbonate and the like.

The amount of the initiator to be used, for example a peroxy carbonate or a peroxy ester, may vary depending on the desired polymer species (e.g. composition), molecular weight, polymerization conditions and the initiator species employed. Generally, however, it is preferably 0.05 to 20 parts by weight, in particular 0.1 to 10 parts by weight, relative to 100 parts by weight of the polymer obtainable by the polymerization.

As for the method of polymerization, the technique of suspension polymerization in an aqueous medium using a fluorine-containing solvent and, as polymerization initiator, a peroxy carbonate or the like is preferred from the industrial viewpoint. However, other polymerization methods, for example solution polymerization, emulsion polymerization and bulk polymerization, can also be employed. In suspension polymerization, a fluorine-containing solvent may be used in addition to water. Usable as the fluorine-containing solvent in suspension polymerization are hydrochlorofluoroalkanes (e.g. $CH_3CClF_2$, $CH_3CCl_2F$, $CF_3CF_2CCl_2H$, $CF_2ClCF_2CFHCl$), chlorofluoroalkanes (e.g. $CF_2ClCFClCF_2CF_3$, $CF_3CFClCFClCF_3$), and perfluoroalkanes (e.g. perfluorocyclobutane, $CF_3CF_2CF_2CF_3$, $CF_3CF_2CF_2CF_2CF_3$, $CF_3CF_2CF_2CF_2CF_2CF_3$). Among them, perfluoroalkanes are preferred. In view of the suspensibility and economy, the fluorine-containing solvent is preferably used in an amount of 10 to 100% by weight relative to water.

The polymerization temperature is not particularly restricted but may be 0 to 100° C. The polymerization pressure is to be selected according to the species, amount and vapor pressure of the solvent employed, the polymerization temperature and other polymerization conditions. Generally, it may be 0 to 9.8 MPaG.

For molecular weight adjustment, conventional chain transfer agents can be used, for example hydrocarbons such as isopentane, n-pentane, n-hexane and cyclohexane; alcohols such as methanol and ethanol; and halogenated hydrocarbons such as carbon tetrachloride, chloroform, methylene chloride and methyl chloride. The terminal carbonate group or ester group content can be controlled by adjusting the polymerization conditions, hence can be controlled by selecting the amount of the peroxy carbonate or peroxy ester employed, the amount of the chain transfer agent employed, the polymerization temperature, etc.

Various methods can be employed for obtaining fluorine-containing ethylenic polymers having a carbonyl halide group or groups at a polymer molecule terminus or termini. For example, such polymers can be obtained by heating, for causing thermal decomposition (decarboxylation), the above-mentioned carbonate group- or ester group-terminated, fluorine-containing ethylenic polymers. The heating temperature depends on the carbonate group or ester group species and the fluorine-containing ethylenic polymer species. Preferably, heating is made so that the temperature of the polymer itself may reach 270° C. or above, preferably 280° C. or above, particularly preferably 300° C. or above. The upper limit to the heating temperature is preferably not higher than the thermal decomposition temperature of other sites than the carbonate group or ester group of the fluorine-containing ethylenic polymer and, more specifically, not higher than 400° C., more preferably not higher than 350° C.

The fluorine-containing ethylenic polymer according to the invention is preferably used alone so that the adhesiveness, heat resistance, chemical resistance, intrinsic in itself may not be impaired. According to the intended purpose and use, however, one or more of various fillers, such as inorganic powders, glass fiber, carbon fiber, metal oxides and carbon may be incorporated therein at levels that will not deteriorate the performance characteristics of the fluorine-containing ethylenic polymer. In addition to the fillers, one or more of pigments, ultraviolet absorbers and other optional additives may be formulated. It is also possible to incorporate, in addition to such additives, a resin, for example another fluororesin or a thermoplastic or thermosetting resin, a synthetic rubber or the like to thereby improve the mechanical properties and weathering resistance, provide decorativeness, prevent electrostatic charging, improve the moldability, and so on. In particular, incorporation of an electrically conductive material, such as carbon black or acetylene black, is of advantage in preventing electrostatic charge accumulation on such products as fuel piping tubes and hoses, hence is preferred.

The layer (B) comprising the fluorine-containing ethylenic polymer according to the invention comprises the above-described fluorine-containing ethylenic polymer and another or other components incorporated according to need and, where necessary, the above layer (B) comprising the fluorine-containing ethylenic polymer may be electrically conductive. The term "electrically conductive" as used herein means that while electrostatic charge may accumulate upon continuous contacting of an insulating material such as a resin with an inflammable fluid such as gasoline, whereby the possibility of inflammation arises, the layer has an electrical property such that this electrostatic charge accumulation will not occur. It is provided in SAEJ 2260, for instance, that the surface resistivity should be not higher than $10^6$ Ω/□. For making the above layer (B) electrically conductive, the above-described electrically conductive material is incorporated preferably at a level not more than 20% by weight, more preferably not more than 15% by weight, in the composition constituting the above layer (B). The lower limit is such a level that can provide the surface resistivity described above.

The resin laminate of the present invention is formed by laminating at least the above layer (A) and layer (B) with each other in an adhered state. Applicable to this process are, for example, the production method comprising molding the constituent layers, including the above layer (A) and layer (B), by successive extrusion or coextrusion and the production method comprising contact bonding of the moldings by heating and pressing, whereby a good adhered state is formed between or among the constituent layers including the above layers (A) and (B). For the above production, machines generally used for molding thermoplastic resins, for example injection molding machines, compression molding machines, blow molding machines, and extrusion molding machines, can be used, and sheets, tubes and various other shapes and forms can be produced. In producing multilayer tubes, multilayer hoses, multilayer tanks and other multilayer molded articles, such molding methods as the multilayer coextrusion molding, multilayer blow molding, and multilayer injection molding methods can be applied. Extrusion molding, in particular multilayer coextrusion molding, is preferred in molding tubes, hoses, sheets and the like. In molding hollow articles, such articles as in cylindrical shape, blow molding can suitably be used. It is also possible to produce lined products by overlaying another substrate with the molded sheet.

The molding conditions vary according to the carbonyl group species, in particular the carbonate group species, and the fluorine-containing ethylenic polymer species. In the case of extrusion or blow molding, it is appropriate to conduct heating so that the cylinder temperature may reach at 200° C. or above. The upper limit to the heating temperature is preferably the temperature at which such adverse effects as foaming due to thermal decomposition of the fluorine-containing ethylenic polymer itself can be suppressed; specifically, it should not be higher than 400° C., particularly preferably not higher than 350° C.

In cases where the molded articles are complicated in shape or where the molded articles are subjected to heating and bending after molding, it is also possible to mold the above-mentioned resin laminate by melt extrusion to form a multilayer molding and subject the thus-formed multilayer molding to 0.01 to 10 hours of heat treatment at a temperature lower than the lowest melting point among the melting points of the resins constituting the above molding to obtain the desired molded article in order to remove the residual strain in the molded article. By employing this production method, it is possible to remove the residual strain, supposedly allow unreacted substances in the vicinity of the layer interface to react and thereby further increase the adhesion strength of the multilayer molded article synergistically. Preferably, the above heat treatment is carried out at 60° C. or above, more preferably at 80° C. or above.

In accordance with the present invention, the initial interlayer adhesion strength between the layer (A) comprising the polyamide-based resin and the layer (B) comprising the fluorine-containing ethylenic polymer can amount to not less than 20 N/cm.

When the above layer (A) and layer (B) are heated in the above manner, the functional groups occurring therein may partly be decomposed or react. The resin laminate comprising such a layer (A) formed by melt extrusion of a polyamide-based resin and a layer (B) formed by melt extrusion is also a resin laminate according to the invention. Therefore, the layer (B) comprising the fluorine-containing ethylenic polymer, for instance, may be one formed by melt extrusion of a fluorine-containing ethylenic polymer having a carbonate group and/or a carbonyl halide group, and, when the functional group decomposition in the step of molding and/or with time is taken into consideration, the layer (B) comprising the fluorine-containing ethylenic polymer is equivalent to one comprising a fluorine-containing ethylenic polymer having at least one group species selected from the group consisting of carbonate group, carbonyl halide group and carboxyl group.

In the practice of the invention, the layer (B) comprising the fluorine-containing ethylenic polymer may have a thickness of less than 0.5 mm. When a layer better in fuel permeability resistance than the layer (B) is used as a layer (C) or layer (D), which is to be described later herein, the layer (B) may be thin. As for the range, the layer (B) may be less than 1.5 times the thickness of the layer (C) or, in case that the layer (D) is laminated, less than 1.5 times the total thickness of the layer (C) and layer (D). In cases where the above layer (B) is to serve as an intermediate adhesive layer, it is therefore possible to reduce the thickness of the adhesive layer. This is economically advantageous.

In the practice of the present invention, the above layer (B) comprising the fluorine-containing ethylenic polymer may be further laminated to a layer (C) comprising a fluororesin. Where necessary, the above layer (C) comprising the fluororesin may contain the electrically conductive material for providing the laminate with electric conductivity. In this case, the level of addition of the electrically conductive material may be such that electric conductivity can be provided. Thus, the addition level may be as described above.

The above-described fluororesin is not particularly restricted but may be any melt-moldable fluororesin, including, for example, tetrafluoroethylene/fluoro (alkylvinyl ether) copolymers (PFA), tetrafluoroethylene/hexafluoropropylene copolymers (FEP), ethylene/tetrafluoroethylene copolymers (ETFE), polychlorotrifluoroethylene (PCTFE), ethylene/chlorotrifluoroethylene copolymers (ECTFE), polyvinylidene fluoride (PVDF) and polyvinyl fluoride (PVF). It may be the above-described fluorine-containing ethylenic polymer.

Among them, those having a melt flow rate of 0.5 to 100 g/10 minutes at an arbitrarily selected temperature between 230° C. and 350° C. are suited for use in producing fuel piping tubes and hoses, which fluororesin retain a low level of liquid agent permeability and excellent in flexibility, cold temperature impact resistance, heat resistance and so forth, by simultaneous multilayer extrusion with the polyamide-based resin.

The fluororesin in the above layer (B) and that in the above layer (C) may be the same or different. From the adhesiveness viewpoint, they are preferably of the same species.

In the practice of the invention, the above layer (B) may be further laminated with a layer (A') comprising a polyamide-based resin in lieu of the layer (C) comprising the fluororesin. Where necessary, the above layer (A') comprising the polyamide-based resin may contain an electrically conductive material for providing electric conductivity. In this case, the polyamide-based resin may be the same as or different from the resin of the above layer (A).

In the practice of the invention, a layer (C) comprising a fluororesin and not containing an electrically conductive material and further a layer (D) comprising a fluororesin and an electrically conductive material may be laminated. In this case, the level of addition of the electrically conductive material may be such that electrical conductivity can be provided. Thus, the addition level may be as described above. Any of the fluororesins described above may be used as the fluororesin constituting the above layer (D), and the fluororesin may be the same as or different from the resin of the above layer (C).

Typically, the resin laminate of the invention is a resin laminate comprising a layer (A) formed by melt extrusion of a polyamide-based resin and a layer (B) formed by melt extrusion of a fluorine-containing ethylenic polymer and laminated to the above layer (A), in which the above layer (A) is formed by melt extrusion of a polyamide-based resin having an amine value of 10 to 60 equivalents/$10^6$ g and the above layer (B) is formed by melt extrusion of a fluorine-containing ethylenic polymer having carbonate groups and/or carbonyl halide groups in a total amount of 3 to 1,000 groups per $1\times10^6$ main chain carbon atoms and having a melting point of 160 to 270° C.

The multilayer molded article according to the invention comprises the above-described resin laminate of the invention. The multilayer molded article includes, for example:

tubes and hoses: automotive fuel piping tubes or hoses, automotive radiator hoses, brake hoses, air conditioner hoses, sheathings and jacketings for wires and cables, optical fiber sheathings and jacketings, and the like;

films and sheets: diaphragm pump diaphragms, various packing members and like sliding members required to have high chemical resistance, films for agricultural use, linings, weather-resistant covers, laminated steel sheets used in the fields of building or construction and home electric appliances, and the like;

tanks: automotive radiator tanks, liquid agent bottles, liquid agent tanks, bags, containers for chemicals, gasoline tanks, and the like;

others: carburetor flange gaskets, fuel pump O rings, like various automotive seals, seals in the chemical industry such as seals in chemical pumps and flow meters, seals in the machinery industry such as hydraulic instrument seals, bellows, spacers, rollers, electronic and electric parts, and the like.

Among them, preferred embodiments are, for example, as follows:

(i) tubes or hoses, in particular automotive fuel piping or liquid agent tubes or hoses, having an at least two-layer structure comprising, as an outer layer, the layer (A) comprising the polyamide-based resin and, as an inner layer, the layer (B) comprising the fluorine-containing ethylenic polymer and containing or not containing the electrically conductive material;

(ii) tubes or hoses, in particular automotive fuel piping or liquid agent tubes or hoses, having an at least three-layer structure comprising, as an outer layer, the layer (A) comprising the polyamide-based resin; as an intermediate layer, the layer (B) comprising the fluorine-containing ethylenic polymer; and, as an inner layer, the layer (C) comprising the fluororesin and containing or not containing the electrically conductive material;

(iii) tubes or hoses, in particular automotive fuel piping tubes or hoses, having an at least three-layer structure comprising, as an outer layer, the layer (A) comprising the polyamide-based resin; as an intermediate layer, the layer (B) comprising the fluorine-containing ethylenic polymer; and, as an inner layer, the layer (A') comprising the polyamide-based resin and containing or not containing the electrically conductive material as necessary; and (iv) tubes or hoses, in particular automotive fuel piping or liquid agent tubes or hoses, having an at least four-layer structure comprising, as an outer layer, the layer (A) comprising the polyamide-based resin; as an intermediate layer, the layer (B) comprising the fluorine-containing ethylenic polymer; as an inner layer, the layer (C) comprising the fluororesin and not containing the electrically conductive material; and, as an innermost layer, the layer (D) comprising the fluororesin and the electrically conductive material.

In the above embodiments (i), (ii) and (iv), it is preferred, from the fuel resistance viewpoint, that the layer coming into contact with a fuel, in particular when it contains an electrically conductive material, has a low MFR. Thus, for example, it may be not higher than 100 g/10 minutes, preferably not higher than 40 g/10 minutes, as measured at 297° C. and, when measured at 265° C., it may be not higher than 50 g/10 minutes, preferably not higher than 20 g/10 minutes.

In the above embodiments (i) to (iv), only the layer (A) comprising the polyamide-based resin or all the layers may be made in the corrugated form or in the convoluted form, for instance, for the purpose of attachability, shock absorption or the like. Furthermore, the tubes or hoses may be supplemented with a necessary part or parts, for example a connector, or may be subjected to bending to give an L- or U-shaped form.

The multilayer molded article according to the invention may have a jacket layer as the outermost layer thereof for the purpose of protection, antifouling, insulation and/or shock absorbance, for instance. The above jacket layer may be formed, for example, by coextrusion with the resin laminate or by covering in a separate step, using a resin or a natural or synthetic rubber, or the like. It is also possible to reinforce the multilayer molded article with a metal or the like.

BEST MODES FOR CARRYING OUT THE INVENTION

The following examples illustrate the present invention in further detail. These examples are, however, by no means limitative of the scope of the present invention. In the following examples, various parameter measurements were carried out in the following manner.

(1) Amine Value Determination

One gram of each polyamide-based resin was dissolved in 50 ml of m-cresol with heating. The solution was titrated with a 1/10 N aqueous solution of p-toluenesulfonic acid using thymol blue as an indicator, and the amount of amino groups occurring in $10^6$ g of the polyamide-based resin was determined.

(2) Acid Value Determination

One gram of each polyamide-based resin was dissolved in 50 ml of benzyl alcohol with heating. The solution was titrated with a 1/30 N sodium hydroxide solution in benzyl alcohol using phenolphthalein as an indicator, and the amount of carboxyl groups occurring in $10^6$ g of the polyamide-based resin was calculated.

(3) Relative Viscosity Determination

According to JIS K 6810, 1 g of each polyamide-based resin was dissolved in 100 ml of 98% sulfuric acid and the viscosity of the solution was measured at 25° C. using an Ubbelohde viscometer.

(4) Determination of the Number of Carbonate Groups

The white powder of each fluorine-containing ethylenic polymer obtained or pieces cut from the melt-extruded pellets were subjected to compression molding at room temperature to give a uniform film having a thickness of 0.05 to 0.2 mm. This film was subjected to infrared absorption spectrophotometry, and the absorbance of the carbonate (—OC(=O)O—) carbonyl-due peak ($v_{C=O}$) appearing at the absorption wavelength corresponding to 1809 cm$^{-1}$ was measured. The number (N) of carbonate groups per 10$^6$ main chain carbon atoms was calculated according to the formula (1) given below:

$$N=500\, AW/\epsilon df \quad (1)$$

A: absorbance of the carbonate (—OC(=O)O—) group-due $v_{C=O}$ peak;

$\epsilon$: molar extinction coefficient of the carbonate (—OC(=O)O—) group-due $v_{C=O}$ peak [1·cm$^{-1}$·mol$^{-1}$]. $\epsilon$=170 was employed on a model compound basis;

W: average molecular weight of monomer units as calculated on the monomer composition basis;

d: film density [g/cm$^3$];

f: film thickness [mm].

Infrared absorption spectrometric analysis was carried out using a Perkin-Elmer FTIR spectrometer 1760x (product of Perkin-Elmer) by performing scanning 40 times. The baseline of the IR spectrum obtained was automatically determined using a Perkin-Elmer Spectrum for Windows Ver. 1.4C, and the absorbance of the peak at 1809 cm$^{-1}$ was measured. The film thickness was measured using a micrometer.

(5) Determination of the Number of Carbonyl Fluoride Groups

A film obtained in the same manner as described above under (4) was subjected to infrared absorption spectrophotometry, and the absorbance of the carbonyl fluoride (—C(=O)F) carbonyl-due peak ($v_{C=O}$) appearing at the wavelength corresponding to 1880 cm$^{-1}$ was determined. Then, the number of carbonyl fluoride groups was calculated by means of the same formula (1) as used above under (4) except that $\epsilon$=600 was employed as the molar extinction coefficient [1·cm$^{-1}$·mol$^{-1}$] of the carbonyl fluoride carbonyl-due $v_{C=O}$ peak on a model compound basis.

(6) Determination of the Number of Other Carbonyl Groups

The number of other carbonyl groups, such as carboxyl groups, ester groups, and acid anhydride groups, essentially capable of reacting with functional groups, such as amide and amino groups, in polyamide-based resins can also be determined by infrared absorption spectrum analysis of a film obtained in the same manner as described above under (4). Thus, the number of other carbonyl groups was determined using the above formula (1) in the same manner as described above under (4) except that $\epsilon$=530 was employed as the molar extinction coefficient [1·cm$^{-1}$·mol$^{-1}$] of such other carbonyl-due $v_{C=O}$ peaks.

(7) Determination of the Composition of the Fluorine-Containing Ethylenic Polymer The determination was carried out by $^{19}$F-NMR analysis.

(8) Melting Point (Tm) Determination

Using a Seiko DSC apparatus (product of Seiko Denshi), the temperature was raised at a rate of 10° C./min and the melting peaks were recorded. The temperature corresponding to the maximum value was reported as the melting point (Tm).

(9) MFR (Melt Flow Rate) Determination

Using a melt indexer (product of Toyo Seiki Seisakusho K.K.), the weights (g) of the polymer flowing out through a nozzle with a diameter of 2 mm and a length of 8 mm within a unit time (10 minutes) were measured under a load of 5 kg at various temperatures.

(10) Appearance of the Multilayer Tube Inside and Outside Surfaces and of the Film Each tube obtained was cut to give two semicircular sections and the outer and inner surfaces were evaluated, and each film was evaluated as obtained, by visual observation or under a stereoscopic microscope at a magnification up to 50 times, for surface roughness, foaming and other defects according to the following criteria:

○: no defects are observed;

Δ: some or other defects are observed on less than 2% of the whole surface;

X: some or other defects are observed on 2% or more of the whole surface.

(11) Multilayer Tube Adhesion Strength Determination

Test specimens with a width of 1 cm were cut from each tube and subjected to 180° peel testing at a rate of 25 mm/min on a Tensilon universal tester. The mean of five maximum values found on an elongation-tensile strength graph was reported as the interlayer adhesion strength.

(12) Film Adhesiveness Evaluation

Each film obtained was totally immersed in distilled water and heated at 130° C. for 1 hour in a tightly closed condition and then cooled to room temperature. This film was dried by maintaining it in an oven controlled at 60° C. for 30 minutes and then observed for its appearance, especially its transparency.

(13) Surface Resistivity Measurement

The method described in SAE J 2260 was followed.

SYNTHESIS EXAMPLE 1

Synthesis of Polyamide-Based Resin PA-A (Nylon 12)

An autoclave was charged with 20 kg of ω-laurolactam and 1 kg of distilled water and, after nitrogen purging, the temperature was raised. After arriving at 280° C., the system inside was maintained at this temperature and a pressure of 3.2 MPa for 5 hours and, thereafter, gradually depressurized. During this period, after dissolution in water and melting of ω-laurolactam, the charge was stirred. After restoration of ordinary pressure in the system, 100 g of stearic acid was added and then stirring was further continued at 260° C. for 5 hours in a nitrogen atmosphere, followed by discharging and cooling with water. Treatment on a pelletizer gave white pellets (polyamide-based resin PA-A). Analyses revealed that these pellets had a melting point of 178° C., an acid value of 28 equivalents/10$^6$ g, an amine value of 6.8 equivalents/10$^6$ g and a relative viscosity of 3.0.

SYNTHESIS EXAMPLE 2

Synthesis of Polyamide-Based Resin PA-B (Nylon 12)

A polyamide-based resin, PA-B, was obtained in the same manner as in Synthesis Example 1 except that the addition of stearic acid was omitted and that the time of stirring in a nitrogen atmosphere was 4 hours. The results of analyses are shown in Table 1.

SYNTHESIS EXAMPLE 3

Synthesis of Polyamide-Based Resin PA-C (Nylon 11)

An autoclave was charged with 20 kg of 11-aminoundecanoic acid powder, 5 kg of distilled water and 100 g of a 30% aqueous solution of phosphoric acid and, after nitrogen purging, the temperature was raised in a tightly closed state. The system was maintained at 120° C. for 2 hours and the temperature was then further raised and the system was maintained at 220° C. and 0.4 MPa for 2 hours and, thereafter, gradually depressurized. During this period, after dissolution in water and melting of 11-aminoundecanoic acid, the charge was stirred. After restoration of ordinary pressure in the system, 110 g of stearic acid was added and then stirring was further continued at 265° C. for 4 hours in a nitrogen atmosphere, followed by discharging and cooling with water. Treatment on a pelletizer gave white pellets (polyamide-based resin PA-C). The results of analyses are shown in Table 1.

SYNTHESIS EXAMPLE 4

Synthesis of Polyamide-Based Resin PA-D (Nylon 11)

Pellets (polyamide-based resin PA-D) were obtained in the same manner as in Synthesis Example 3 except that the addition of stearic acid was omitted and that the time of stirring in a nitrogen atmosphere was 3 hours. The results of analyses are shown in Table 1.

SYNTHESIS EXAMPLE 5

Synthesis of Polyamide-Based Resin PA-E (Plasticizer-Containing Nylon 12)

The polyamide-based resin PA-B and an N-ethyltoluenesulfonamide were dry blended in a weight ratio of 95/5, and the blend was extruded at 260° C. and at a discharge amount of 350 g/min using a twin-screw extruder (product of Ikegai Tekkosho, PCM-45). After cooling with water, treatment on a pelletizer gave white pellets (polyamide-based resin PA-E).

SYNTHESIS EXAMPLE 6

Synthesis of Polyamide-Based Resin PA-F (Nylon 6)

An autoclave was charged with 20 kg of ε-caprolactam and 2 kg of distilled water and, after nitrogen purging, the temperature was raised. After arriving at 120° C., this temperature was maintained and, after dissolution in water and melting of ε-caprolactam, stirring was started, then the temperature was further raised to 220° C. and the system inside was maintained at this temperature and a pressure of 0.4 MPa for 5 hours. Thereafter, the system temperature was raised to 250° C. while gradual depressurization. After restoration of ordinary pressure in the system, stirring was further continued at that temperature for 3 hours in a nitrogen atmosphere, followed by discharging and cooling with water. Treatment on a pelletizer gave white pellets. These pellets were then immersed in distilled water at 80° C. for 12 hours for extraction of the monomer and other low-molecular products. The pellets were thoroughly dried and submitted to the subsequent procedure. The results of the analyses of the pellets after drying (polyamide-based resin PA-F) are shown in Table 1.

TABLE 1

| Synthesis example | Polyamide resin | Amine value (eq/$10^6$ g) | Acid value (eq/$10^6$ g) | Melting point (° C.) | Relative viscosity |
|---|---|---|---|---|---|
| 1 | PA-A | 6.8 | 28 | 178 | 3.0 |
| 2 | PA-B | 24 | 29 | 178 | 3.2 |
| 3 | PA-C | 8.4 | 33 | 186 | 2.9 |
| 4 | PA-D | 32 | 34 | 186 | 2.9 |
| 5 | PA-E | 23 | 28 | 174 | 3.0 |
| 6 | PA-F | 31 | 35.2 | 224 | 3.4 |

SYNTHESIS EXAMPLE 7

Synthesis of Fluorine-Containing Ethylenic Polymer F-A

An autoclave was charged with 380 L of distilled water and, after thorough nitrogen purging, charged with 75 kg of 1-fluoro-1,1-dichloroethane, 155 kg of hexafluoropropylene and 0.5 kg of perfluoro(1,1,5-trihydro-1-pentene), and the system inside was maintained at 35° C. and at a stirring rate of 200 rpm. Thereafter, tetrafluoroethylene was charged under pressure to 0.7 MPa, followed by charging of ethylene under pressure to 1.0 MPa. Then, 2.4 kg of di-n-propyl peroxydicarbonate was charged to initiate the polymerization. As the polymerization progressed, the system inside pressure decreased, so that a mixed gas composed of tetrafluoroethylene/ethylene/hexafluoropropylene=40.5/44.5/15.0 mole percent was continuously fed to maintain the system inside pressure at 1.0 MPa. As for perfluoro(1,1,5-trihydro-1-pentene), a total of 1.5 kg was charged continuously. Stirring was continued for 20 hours. Then, after depressurization to atmospheric pressure, the reaction product was washed with water and dried to give 200 kg of a powder (fluorine-containing ethylenic polymer F-A). The results of analyses of this product are shown in Table 2.

SYNTHESIS EXAMPLES 8, 9 AND 15

Synthesis of Fluorine-Containing Ethylenic Polymers F-B, F-C and F-K

Fluorine-containing ethylenic polymers F-B, F-C and F-K having the respective compositions shown in Table 2 were obtained in the same manner as in Synthesis Example 7. The results of analyses of them are shown in Table 2.

SYNTHESIS EXAMPLE 10

Synthesis of Fluorine-Containing Ethylenic Polymer F-D

An autoclave was charged with 400 L of distilled water and, after thorough nitrogen purging, charged with 320 kg of perfluorocyclobutane, 80 kg of hexafluoropropylene, 19 kg of tetrafluoroethylene and 6 kg of vinylidene fluorides and the system inside was maintained at 35° C. and at a stirring rate of 180 rpm. Thereafter, 5 kg of di-n-propyl peroxydicarbonate was charged to initiate the polymerization. As the polymerization progressed, the system inside pressure decreased, so that a mixed gas composed of tetrafluoroethylene/vinylidene fluoride/hexafluoropropylene=50/40/10 mole percent was continuously fed to maintain the system inside pressure at a constant level. Stirring was continued for 30 hours. Then, after depressurization to atmospheric pressure, the reaction product was washed with water and dried to give 200 kg of a powder (fluorine-containing ethylenic polymer F-D). The results of analyses of this product are shown in Table 2.

SYNTHESIS EXAMPLE 11

Synthesis of Fluorine-Containing Ethylenic Polymer F-E

An autoclave was charged with 400 L of distilled water and, after thorough nitrogen purging, charged with 75 kg of 1-fluoro-1,1-dichloroethane, 190 kg of hexafluoropropylene and 1.5 kg of perfluoro(1,1,5-trihydro-1-pentene), and the system inside was maintained at 35° C. and at a stirring rate of 200 rpm. Thereafter, tetrafluoroethylene was charged under pressure to 0.7 MPa, followed by charging of ethylene under pressure to 1.0 MPa. Then, 2.6 kg of di-n-propyl peroxydicarbonate was charged to initiate the polymerization. As the polymerization progressed, the system inside pressure decreased, so that a mixed gas composed of tetrafluoroethylene/ethylene/hexafluoropropylene=40.5/42.5/17.0 mole percent was continuously fed to maintain the system inside pressure at 1.0 MPa. Stirring was continued for 30 hours. Then, after depressurization to atmospheric pressure, the reaction product was washed with water and dried to give 172 kg of a powder. The powder obtained was then extruded at a cylinder temperature of 320° C. using a single screw extruder (product of Tanabe Practice Kikai, VS 50-24) to give pellets (fluorine-containing ethylenic polymer F-E). The results of analyses of this product are shown in Table 2.

SYNTHESIS EXAMPLE 12

Synthesis of Fluorine-Containing Ethylenic Polymer F—F

The powder of fluorine-containing ethylenic polymer F-C as obtained in Synthesis Example 9 was dry-blended with an electrically conductive material (acetylene black) in a mixing ratio of 90/10 by weight, and the mixture was melted and kneaded at a cylinder temperature of 250° C. using a twin-screw extruder (product of Ikegai Tekkosho, PCM-45). The results of analyses of the thus-obtained pellets (fluorine-containing ethylenic polymer F—F) are shown in Table 2.

SYNTHESIS EXAMPLE 13

Synthesis of Fluorine-Containing Ethylenic Polymer F-G

The fluorine-containing ethylenic polymer F-B obtained in Synthesis Example 8 was dry-blended with an electrically conductive material (acetylene black) in a mixing ratio of 85/15 by weight, and the mixture was melted and kneaded in the same manner as in Synthesis Example 12 except that the cylinder temperature was 245° C. The results of analyses of the thus-obtained pellets (fluorine-containing ethylenic polymer F-G) are shown in Table 2.

SYNTHESIS EXAMPLE 14

Synthesis of Fluorine-Containing Ethylenic Polymer F-H

An autoclave was charged with 9.5 kg of the powder of fluorine-containing ethylenic polymer F-B as obtained in Synthesis Example 8, 700 g of 28% aqueous ammonia and 10 L of distilled water, the system was heated with stirring, and stirring was continued for 7 hours while maintaining the temperature at 80° C. The contents were washed with water and subjected to drying treatment to give 9.2 kg of a powder. By such treatment, the active functional groups (carbonate groups and carbonyl fluoride groups) contained in the resin were converted to amide groups, which are chemically and thermally stable. The quantitative progress of such conversion was confirmed by infrared spectrophotometry. The results of analyses of the resin after treatment are shown in Table 2. No other carbonyl groups than carbonate groups and carbonyl fluoride groups could be detected in the fluorine-containing ethylenic polymers (F-A to F-G and F-K) mentioned in Synthesis Examples 7 to 13 and 15. In Table 2, TFE stands for tetrafluoroethylene, Et for ethylene, HFP for hexafluoropropylene, VdF for vinylidene fluoride, and HF—Pa for perfluoro(1,1,5-trihydro-1-pentene).

TABLE 2

| Synthesis example | Fluorine-containing ethylenic polymer | Monomer composition (mole %) | | | | | Number of groups occurring per $10^6$ main chain carbon atoms | | Melting point (° C.) | MFR (g/10 min) (measurement temperature (° C.)) |
| --- | --- | --- | --- | --- | --- | --- | --- | --- | --- | --- |
| | | TFE | Et | HFP | VdF | HF-Pa | Carbonate groups | Carbonyl fluoride groups | | |
| 7 | F-A | 40.8 | 44.8 | 13.9 | — | 0.5 | 300 | 3 | 162.5 | 2.6 (230) |
| 8 | F-B | 46.2 | 43.8 | 9.5 | — | 0.5 | 255 | 5 | 194.3 | 8.9 (230) |
| 9 | F-C | 47.1 | 44.1 | 8.3 | — | 0.5 | 189 | 7 | 207.4 | 8.3 (230) |
| 10 | F-D | 51.3 | — | 9.8 | 38.9 | — | 311 | 3 | 169.2 | 13.8 (230) |
| 11 | F-E | 40.5 | 45 | 14 | — | 0.5 | 67 | 67 | 170.2 | 11.3 (230) |
| 12 | F-F | 47.1 | 44.1 | 8.3 | — | 0.5 | 102 | 25 | 208.8 | 4.9 (265) 9.8 (297) |
| 13 | F-G | 46.1 | 43.8 | 9.5 | — | 0.5 | 76 | 38 | 196.1 | 4.2 (265) 8.5 (297) |
| 14 | F-H | 46.1 | 43.8 | 9.5 | — | 0.5 | Not detected | Not detected | 193.5 | 9.8 (230) |
| 15 | F-K | 54.1 | 42.9 | — | — | 3.0 | 55 | 12 | 252.1 | 19.8 (297) |

EXAMPLE 1

Using a tube extrusion machine for three components and three layers equipped with a multi-manifold die, a tube with an outside diameter of 8 mm and an inside diameter of 6 mm was molded continuously by feeding the polyamide-based resin PA-B, fluorine-containing ethylenic polymer F-A and fluorine-containing ethylenic polymer F-J into each extruder so that they might form the outer layer, intermediate layer and inner layer of the tube, respectively. The molding conditions and the results of evaluation of the tube obtained are shown in Table 3.

EXAMPLES 2 TO 14 AND COMPARATIVE EXAMPLES 1 TO 6

Multilayer tubes were molded in the same manner as in Example 1 except that the resins shown in Table 1 and Table 2 and the molding conditions were used. The molding conditions and the results of evaluation of the tubes obtained are shown in Table 3 (Examples 1 to 14) and Table 4 (Comparative Examples 1 to 6). Furthermore, in Example 9, the tube obtained was subjected to 1 hour of heat treatment at 160° C. and then again measured for adhesion strength. An improvement in adhesion strength from 35.1 N/cm to 37.6 N/cm was found.

In Comparative Examples 1 to 6, the polyamide-based resins used were low in amine value, so that they showed an unsatisfactory level of interlayer adhesion strength with the layers made of the fluorine-containing ethylenic polymers. In the table, the fluorine-containing ethylenic polymer F-I was a commercially available ETFE (Daikin Industries' Neoflon (registered trademark) ETFE EP-610) and F-J was a commercially available, electrically conductive ETFE (Daikin Industries' Neoflon (registered trademark) ETFE EP-610AS)

EXAMPLES 15 TO 18 AND COMPARATIVE EXAMPLES 7 AND 8

Multilayer tubes with an outside diameter of 8 mm and an inside diameter of 6 mm were molded using a tube extrusion machine for two components and two layers or a tube extrusion machine for four components and four layers equipped with a multi-manifold die. The molding conditions and the results of evaluation of the tubes obtained are shown in Table 5. In Comparative Examples 7 and 8, the fluorine-containing ethylenic polymer used contained no carbonyl groups than amide groups, so that the interlayer adhesion strength between the layers made of this and the polyamide-based resin was unsatisfactory. In Comparative Example 8, the molding temperature for each layer was raised but foaming, for instance, occurred and the appearance was impaired thereby, and the interlayer adhesion strength rather decreased.

TABLE 3

| | | Example | | | | | | | | | | | | | |
|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 |
| Outer layer resin | | PA-B | PA-B | PA-B | PA-D | PA-E | PA-B | PA-B | PA-B | PA-B | PA-B | PA-B | PA-B | PA-B | PA-B |
| Intermediate layer resin | | F-A | F-B | F-C | F-A | F-A | F-A | F-D | F-A | F-E | F-A | F-A | F-B | F-K | F-K |
| Inner layer resin | | F-J | F-J | F-J | F-J | F-A | F-A | F-D | F-I | F-J | F-J | F-J | F-F | F-J | F-K |
| Cylinder | Outer layer | 245 | 245 | 245 | 245 | 245 | 245 | 245 | 245 | 245 | 245 | 245 | 245 | 245 | 245 |
| temp. (° C.) | Intermediate layer | 265 | 275 | 275 | 265 | 265 | 265 | 250 | 265 | 265 | 265 | 265 | 275 | 290 | 290 |
| | Inner layer | 330 | 330 | 330 | 330 | 265 | 265 | 250 | 300 | 330 | 330 | 330 | 275 | 330 | 290 |
| Die temperature (° C.) | | 260 | 260 | 260 | 260 | 260 | 260 | 250 | 260 | 260 | 260 | 260 | 260 | 260 | 260 |
| Tube line speed (m/min) | | 8.0 | 8.0 | 8.0 | 8.0 | 8.0 | 8.0 | 8.0 | 8.0 | 8.0 | 8.0 | 8.0 | 8.0 | 8.0 | 8.0 |
| Thickness | Outer layer | 0.76 | 0.75 | 0.74 | 0.75 | 0.70 | 0.70 | 0.69 | 0.71 | 0.74 | 0.71 | 0.74 | 0.75 | 0.75 | 0.70 |
| of each | Intermediate layer | 0.10 | 0.09 | 0.10 | 0.10 | | | | 0.09 | 0.11 | 0.15 | 0.05 | 0.11 | 0.15 | |
| layer (mm) | Inner layer | 0.15 | 0.15 | 0.15 | 0.16 | 0.30 | 0.30 | 0.30 | 0.21 | 0.15 | 0.15 | 0.20 | 0.15 | 0.15 | 0.30 |
| Appearance of tube inside and outside surfaces | | ○ | ○ | ○ | ○ | ○ | ○ | ○ | ○ | ○ | ○ | ○ | ○ | ○ | ○ |
| Adhesion strength (N/cm) | | 35.6 | 32.5 | 30.8 | 37.1 | 39.5 | 32.4 | 29 | 32.6 | 35.1 | 39.8 | 35.1 | 31.1 | 33.9 | 35.1 |
| Surface resistivity (MΩ/□) | | 0.04 | 0.05 | 0.05 | 0.05 | — | — | — | — | 0.05 | 0.05 | 0.03 | 0.05 | 0.05 | — |

TABLE 4

| | | Comparative Example | | | | | |
|---|---|---|---|---|---|---|---|
| | | 1 | 2 | 3 | 4 | 5 | 6 |
| Outer layer resin | | PA-A | PA-A | PA-C | PA-A | PA-C | PA-C |
| Intermediate layer resin | | F-A | F-B | F-A | F-A | F-D | F-H |
| Inner layer resin | | F-J | F-J | F-J | F-A | F-D | F-J |
| Cylinder | Outer layer | 245 | 245 | 245 | 245 | 245 | 245 |
| temp. (° C.) | Intermediate layer | 265 | 275 | 265 | 265 | 250 | 275 |
| | Inner layer | 330 | 330 | 330 | 265 | 250 | 330 |
| Die temperature (° C.) | | 260 | 260 | 260 | 260 | 250 | 260 |
| Tube line speed (m/min) | | 8.0 | 8.0 | 8.0 | 8.0 | 8.0 | 8.0 |
| Thickness | Outer layer | 0.75 | 0.75 | 0.75 | 0.70 | 0.70 | 0.75 |
| of each | Intermediate layer | 0.11 | 0.11 | 0.09 | | | 0.11 |
| layer (mm) | Inner layer | 0.15 | 0.15 | 0.15 | 0.3 | 0.29 | 0.15 |
| Appearance of tube inside and outside surfaces | | ○ | ○ | ○ | ○ | ○ | ○ |
| Adhesion strength (N/cm) | | 13.4 | 12.4 | 16.2 | 12.1 | 12 | 7.2 |
| Surface resistivity (MΩ/□) | | 0.05 | 0.05 | 0.05 | — | — | — |

TABLE 5

| | Example | | | | Comparative Example | |
|---|---|---|---|---|---|---|
| | 15 | 16 | 17 | 18 | 7 | 8 |
| A layer resin | PA-E | PA-E | PA-B | PA-E | PA-B | PA-B |
| B layer resin | F-F | F-G | F-G | F-A | F-H | F-H |

TABLE 5-continued

|  |  | Example | | | | Comparative Example | |
|---|---|---|---|---|---|---|---|
|  |  | 15 | 16 | 17 | 18 | 7 | 8 |
| C layer resin | | — | — | — | F-I | — | — |
| D layer resin | | — | — | — | F-J | — | — |
| Cylinder temp. (° C.) | A layer | 245 | 245 | 245 | 245 | 245 | 245 |
| | B layer | 275 | 275 | 275 | 265 | 275 | 350 |
| | C layer | — | — | — | 300 | — | — |
| | D layer | — | — | — | 330 | — | — |
| Die temperature (° C.) | | 260 | 260 | 260 | 260 | 260 | 260 |
| Tube line speed (m/min) | | 8.0 | 8.0 | 8.0 | 8.0 | 8.0 | 8.0 |
| Thickness of each layer (mm) | A layer | 0.70 | 0.71 | 0.71 | 0.70 | 0.70 | 0.70 |
| | B layer | 0.30 | 0.29 | 0.29 | 0.10 | 0.30 | 0.30 |
| | C layer | — | — | — | 0.15 | — | — |
| | D layer | — | — | — | 0.05 | — | — |
| Appearance of tube inside and outside surfaces | | ○ | ○ | ○ | ○ | ○ | X |
| Adhesion strength (N/cm) | | 35.6 | 35.4 | 28.3 | 39.8 | 11.7 | (**) |
| Surface resistivity (MΩ/□) | | — | — | — | 0.1 | — | — |

(**) Manual interlayer separation was feasible with ease.

EXAMPLES 19 TO 21 AND COMPARATIVE EXAMPLES 9 TO 12

To examine the interlayer adhesion strength between the layer made of a polyamide-based resin and the layer made of a fluorine-containing ethylenic polymer in further detail, such multilayer films as described below were molded and evaluated. Thus, multilayer films were extruded using an extrusion machine for two components and two layers equipped with a feed block type coathanger T die (lip gap 800 μm, width 450 mm). Each film was cooled by bringing into close contact with a casting roll controlled at 20° C. and then both edges of the film were chucked and thermally set with hot air at 150° C., and the 100-μm-thick multilayer film was continuously wound up. The molding conditions and the results of evaluation of the films obtained are shown in Table 6. In Comparative Examples 9 to 12, the interlayer adhesion strength was insufficient, so that water vapor that had penetrated through the polyamide resin layer remained between the layers even after drying and, in every case, caused whitening. The layers of each whitened film could be peeled off from each other with ease by the hands and, when dried in the same manner after peeling, the each layers restored transparency.

TABLE 6

|  |  | Example | | | Comparative Example | | | |
|---|---|---|---|---|---|---|---|---|
|  |  | 19 | 20 | 21 | 9 | 10 | 11 | 12 |
| A layer resin | | PA-D | PA-B | PA-D | PA-C | PA-A | PA-C | PA-B |
| B layer resin | | F-B | F-B | F-C | F-B | F-B | F-C | F-H |
| Cylinder temp. (° C.) | A layer | 245 | 245 | 245 | 245 | 245 | 245 | 245 |
| | B layer | 275 | 275 | 275 | 275 | 275 | 275 | 300 |
| Die temperature (° C.) | | 260 | 260 | 260 | 260 | 260 | 260 | 260 |
| Thickness of each layer (μm) | A layer | 60 | 62 | 60 | 60 | 57 | 62 | 55 |
| | B layer | 40 | 38 | 41 | 43 | 45 | 40 | 46 |
| Film appearance | | ○ | ○ | ○ | ○ | ○ | ○ | ○ |
| Film appearance after treatment | | ○ | ○ | ○ | X | X | X | X |

EXAMPLES 22 AND 23 AND COMPARATIVE EXAMPLE 13

Molding of Multilayer Blown Cylinders

Using a multilayer blow molding machine for two components and two layers equipped with a die having a die diameter of 12 mm and a core diameter of 8.5 mm, cylindrical molded articles with a diameter of 40 mm and a height of 300 mm were obtained. The molding conditions and the results of evaluation of the molded articles obtained are shown in Table 7. The adhesion strength was measured along the longitudinal direction of the cylinder side.

TABLE 7

|  |  | Example | | Comparative Example |
|---|---|---|---|---|
|  |  | 22 | 23 | 13 |
| A layer resin | | PA-B | PA-F | PA-B |
| B layer resin | | F-A | F-A | F-H |
| Cylinder temp. (° C.) | A layer | 250 | 250 | 250 |
| | B layer | 275 | 260 | 275 |
| Die temperature (° C.) | | 260 | 250 | 260 |
| Thickness of each layer (mm) | A layer | 0.73 | 0.75 | 0.70 |
| | B layer | 0.30 | 0.25 | 0.30 |
| Appearance of cylindrical article inside and outside surfaces | | ○ | ○ | ○ |
| Adhesion strength (N/cm) | | 25.1 | 31.2 | 12.4 |

The above-described Examples and Comparative Examples revealed that the resin laminates according to the present invention, which comprise a layer (A) comprising a polyamide-based resin and a layer (B) comprising a fluorine-containing ethylenic polymer, were markedly improved in interlayer adhesion strength, without showing any defect in appearance. It was revealed, however, that when the fluorine-containing ethylenic polymer used has amide groups alone as carbonyl groups, the adhesion strength was very poor and such polymer almost lacked practicability.

INDUSTRIAL APPLICABILITY

The present invention, which has the constitutions described above, can markedly improve the interlayer adhesion strength of a laminates, in particular the adhesion strength between the polyamide-based resin and fluororesin. Furthermore, by using a specific fluorine-containing ethylenic polymer as the fluororesin, it becomes possible to markedly improve the adhesion strength of the whole laminate even when a fluororesin is used as an inner layer. Therefore, by using a polyamide-based resin as an outer layer, it is possible to provide molded articles with good mechanical properties and high levels of resistance to external environmental factors such as heat and various chemical substances and, by using a fluororesin layer as an innermost layer, it is possible to provide the molded articles with those heat resistance, oil and chemical resistance and low liquid agent permeability which the fluororesin has. In addition, excellent molded articles markedly and stably improved in interlayer adhesion can be produced by coextrusion molding, and this is very advantageous from the industrial viewpoint.

What is claimed is:

1. A resin laminate
   which comprises a layer (A) consisting essentially of a polyamide-based resin and a layer (B) comprising a fluorine-containing ethylenic polymer laminated to said layer (A),
   said polyamide-based resin having an amine value of 10 to 60 equivalents/$10^6$ g, and
   said fluorine-containing ethylenic polymer being a fluorine-containing ethylenic polymer having a carbonyl group.

2. The resin laminate according to claim 1,
wherein the polyamide-based resin has an acid value of not higher than 80 equivalents/$10^6$ g.

3. The resin laminate according to claim 1,
wherein the polyamide-based resin comprises at least one species selected from the group consisting of nylon 6, nylon 66, nylon 11, nylon 12, nylon 610, nylon 612, nylon 6/66, nylon 66/12, nylon 6/polyester copolymers, nylon 6/polyether copolymers, nylon 12/polyester copolymers, nylon 12/polyether copolymers, and blends thereof.

4. The resin laminate according to claim 3,
wherein a main component of the polyamide-based resin is nylon 11, nylon 12, nylon 610, nylon 612, a nylon 6/polyether copolymer or a nylon 12/polyether copolymer.

5. The resin laminate according to claim 1,
wherein the carbonyl group content of the fluorine-containing ethylenic polymer is 3 to 1,000 groups, in total, per $1 \times 10^6$ main chain carbon atoms.

6. The resin laminate according to claim 1,
wherein the carbonyl group of the fluorine-containing ethylenic polymer is derived from a peroxide.

7. The resin laminate according to claim 1,
wherein the layer (B) comprising the fluorine-containing ethylenic polymer is one formed by melt extrusion of a fluorine-containing ethylenic polymer having a carbonate group and/or a carbonyl halide group.

8. The resin laminate according to claim 1,
wherein the layer (B) comprising the fluorine-containing ethylenic polymer comprises a fluorine-containing ethylenic polymer having at least one species selected from the group consisting of carbonate group, carbonyl halide group and carboxyl group in a total amount of 3 to 1,000 groups per $1 \times 10^6$ main chain carbon atoms.

9. The resin laminate according to claim 1,
wherein the fluorine-containing ethylenic polymer is one resulting from polymerization of at least tetrafluoroethylene and ethylene.

10. The resin laminate according to claims 1,
wherein the fluorine-containing ethylenic polymer is one resulting from polymerization of at least tetrafluoroethylene and a compound represented by the general formula:

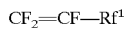

in the formula, $Rf^1$ represents $CF_3$ or $ORf^2$ and $Rf^2$ represents a perfluoroalkyl group containing 1 to 5 carbon atoms.

11. The resin laminate according to claim 1,
wherein the fluorine-containing ethylenic polymer is a copolymer resulting from polymerization of at least the following a, b and c:
a. 20 to 90 mole percent of tetrafluoroethylene;
b. 10 to 80 mole percent of ethylene;
c. 1 to 70 mole percent of a compound represented by the general formula:

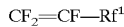

in the formula, $Rf^1$ represents $CF_3$ or $ORf^2$ and $Rf^2$ represents a perfluoroalkyl group containing 1 to 5 carbon atoms.

12. The resin laminate according to claim 1,
wherein the fluorine-containing ethylenic polymer is a copolymer resulting from polymerization of at least the following d, e and f:
d. 15 to 60 mole percent of vinylidene fluoride;
e. 35 to 80 mole percent of tetrafluoroethylene;
f. 5 to 30 mole percent of hexafluoropropylene.

13. The resin laminate according to claim 1,
wherein the fluorine-containing ethylenic polymer has a melting point of 160 to 270° C.

14. The resin laminate according to claim 1,
wherein the layer (B) comprising the fluorine-containing ethylenic polymer is electrically conductive.

15. The resin laminate according to claim 1,
wherein an initial interlayer adhesion strength between the layer (A) consisting essentially of the polyamide-based resin and the layer (B) comprising the fluorine-containing ethylenic polymer is not less than 20 N/cm.

16. The resin laminate according to claim 1,
wherein the layer (B) comprising the fluorine-containing ethylenic polymer has a thickness of less than 0.5 mm.

17. The resin laminate according to claim 1,
wherein the layer (B) comprising the fluorine-containing ethylenic polymer is further laminated to a layer (C) comprising a fluororesin,
said layer (C) containing or not containing an electrically conductive material.

18. The resin laminate according to claim 17,
wherein the layer (C) comprising the fluororesin and not containing the electrically conductive material is further laminated to a layer (D) comprising a fluororesin and an electrically conductive material.

19. The resin laminate according to claim 18, wherein the thickness of the layer (B) is less than 1.5 times the total thickness of said layer (C) and said layer (D).

20. A multilayer molded article which comprises the resin laminate according to claim 18.

21. The multilayer molded article according to the added claim 20, which is a molded article selected from the group consisting of films, hoses, tubes, bottles and tanks.

22. The multilayer molded article according to claim 21,
which is an automotive fuel piping tube or hose having an at least four-layer structure comprising, as an outer layer, the layer (A) consisting essentially of the polyamide-based resin; as an intermediate layer, the layer (B) comprising the fluorine-containing ethylenic polymer; as an inner layer, the layer (C) comprising the fluororesin and not containing the electrically conductive material; and, as an innermost layer, the layer (D) comprising the fluororesin and the electrically conductive material.

23. The resin laminate according to claim 17,
wherein the thickness of said layer (B) is less than 1.5 times the thickness of said layer (C).

24. A multilayer molded article which comprises the resin laminate according to claim 17.

25. The multilayer molded article according to claim 24, which is a molded article selected from the group consisting of films, hoses, tubes, bottles and tanks.

26. The multilayer molded article according to claim 25,
which is an automotive fuel piping tube or hose having an at least three-layer structure comprising, as an outer layer, the layer (A) consisting essentially of the polyamide-based resin; as an intermediate layer, the layer (B) comprising the fluorine-containing ethylenic polymer; and, as an inner layer, the layer (C) comprising the fluororesin and containing or not containing the electrically conductive material.

27. A multilayer molded article which comprises the resin laminate according to claim 1.

28. The multilayer molded article according to claim 27, which is a molded article selected from the group consisting of films, hoses, tubes, bottles and tanks.

29. The multilayer molded article according to claim 28, which is an automotive fuel piping tube or hose having an at least two-layer structure comprising, as an outer layer, the layer (A) consisting essentially of the polyamide-based resin and, as an inner layer, the layer (B) comprising the fluorine-containing ethylenic polymer.

30. A resin laminate having an at least two-layer structure, which comprises a layer (A) formed by melt extrusion and consisting essentially of a polyamide-based resin and a layer (B) formed by melt extrusion of a fluorine-containing ethylenic polymer and laminated to said layer (A), said layer (A) being one formed by melt extrusion of a polyamide-based resin having an amine value of 10 to 60 equivalents/$10^6$ g, said layer (B) being one formed by melt extrusion of a fluorine-containing ethylenic polymer having carbonate groups and/or carbonyl halide groups in a total amount of 3 to 1,000 groups per $1\times10^6$ main chain carbon atoms and having a melting point of 160 to 270° C.

31. The resin laminate according to claim 30, wherein an initial interlayer adhesion strength between said layer (A) and said layer (B) is not less than 20 N/cm.

32. A production method of a multilayer molded article having an at least two-layer structure comprising a layer (A) formed by melt extrusion and consisting essentially of a polyamide-based resin having an amine value of 10 to 60 equivalents/$10^6$ g and a layer (B) formed by melt extrusion of a fluorine-containing ethylenic polymer having 3 to 1,000 carbonyl groups, in total, per $1\times10^6$ main chain carbon atoms and laminated to said layer (A), which method comprises molding a resin laminate having said layer (A) and said layer (B) by melt extrusion to form a multilayer molding and subjecting the thus-formed multilayer molding to 0.01 to 10 hours of heat treatment at a temperature lower than the lowest melting point among the melting points of the resins constituting said molding to obtain the multilayer molded article.

* * * * *